United States Patent [19]

Roux et al.

[11] Patent Number: 4,672,542

[45] Date of Patent: Jun. 9, 1987

[54] METHOD FOR PROCESSING LOCATING PULSES SUPPLIED BY A GAMMA CAMERA AND A GAMMA CAMERA UTILIZING THIS METHOD

[75] Inventors: Georges Roux, Limours; Corinne Mestais, Massy; René Gauthier, Antony, all of France

[73] Assignee: Informatek - Sopha Medical, Les Ulis, France

[21] Appl. No.: 612,367

[22] Filed: May 21, 1984

[30] Foreign Application Priority Data

May 27, 1983 [FR] France ................................ 83 08825

[51] Int. Cl.⁴ ............ G01T 1/208 A; G01T 1/164 A; G01T 1/20
[52] U.S. Cl. ................................ 364/414; 250/363 S; 250/369
[58] Field of Search .................... 364/414; 250/363 S, 250/369

[56] References Cited

U.S. PATENT DOCUMENTS

| | | | |
|---|---|---|---|
| 3,916,198 | 10/1975 | Coltman et al. ................ | 250/369 X |
| 3,953,735 | 4/1976 | Stout .............................. | 250/363 S |
| 4,058,728 | 11/1977 | Nickles ........................... | 250/363 S |
| 4,060,730 | 11/1977 | Zioni et al. ..................... | 250/366 X |
| 4,095,108 | 6/1978 | Inbar et al. ..................... | 250/369 |
| 4,142,102 | 2/1979 | Lange ............................. | 250/369 |
| 4,298,944 | 11/1981 | Stoub et al. ............. | 250/363 S E X |
| 4,369,495 | 1/1983 | Inbar et al. ............. | 250/363 S E X |
| 4,476,384 | 10/1984 | Westphal ....................... | 250/369 X |
| 4,516,025 | 5/1985 | Yamakawa et al. ............ | 250/369 X |
| 4,532,425 | 6/1985 | Abileah et al. ................. | 250/368 X |
| 4,566,074 | 1/1986 | Nishikawa ...................... | 250/369 X |

FOREIGN PATENT DOCUMENTS 1225058 3/1971 United Kingdom .

Primary Examiner—Jerry Smith
Assistant Examiner—Charles B. Meyer
Attorney, Agent, or Firm—Roland Plottel

[57] ABSTRACT

The invention relates to a method for processing locating pulses supplied by a gamma camera and to a gamma camera utilizing this method. In accordance with the invention, locating pulses $(X^+, X^-, Y^+, Y^-)$ are taken into account by a calculator circuit (12) which performs the standardization of an (X,Y) coordinate signal proportional to the difference of two locating pulses $(X^+ - X^-)$ along an axis by the sum of these same two locating pulses $(X^+ + X^-)$ along this axis.

3 Claims, 3 Drawing Figures

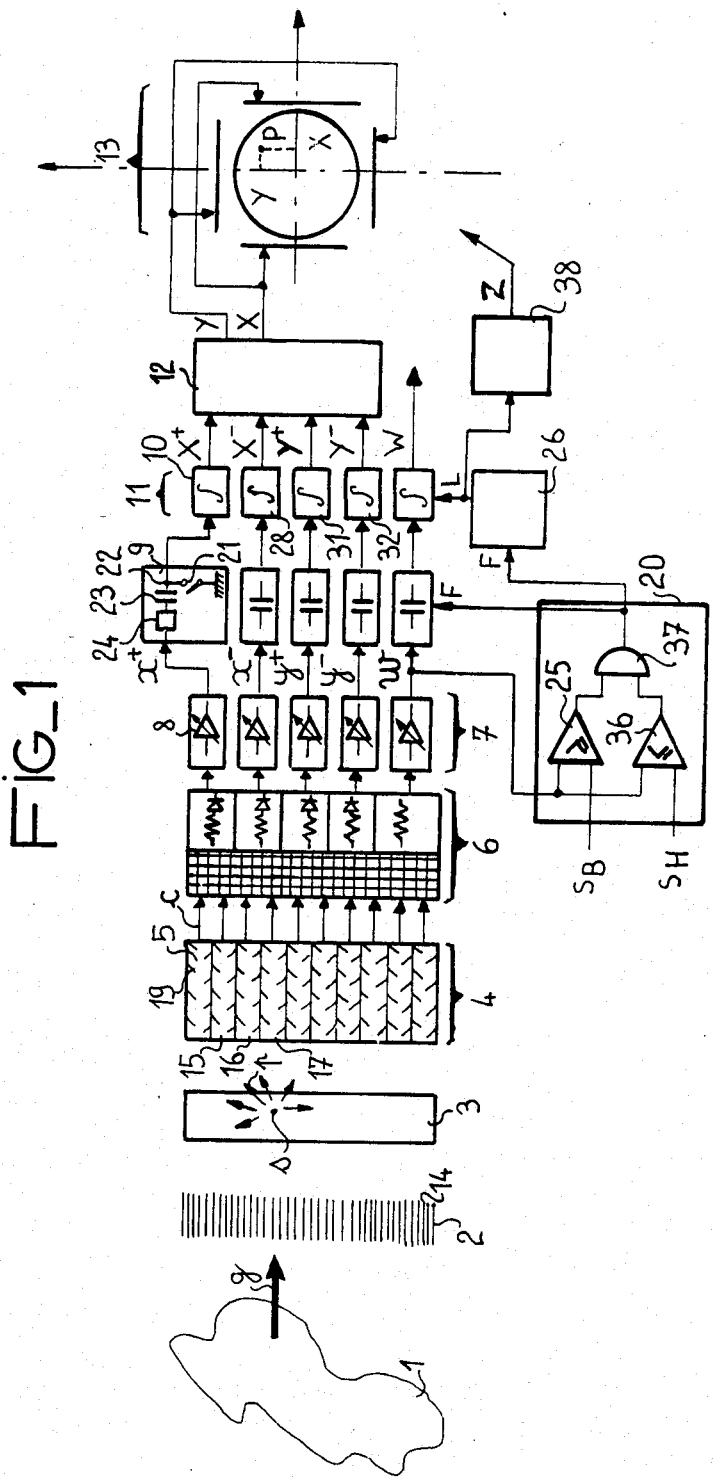

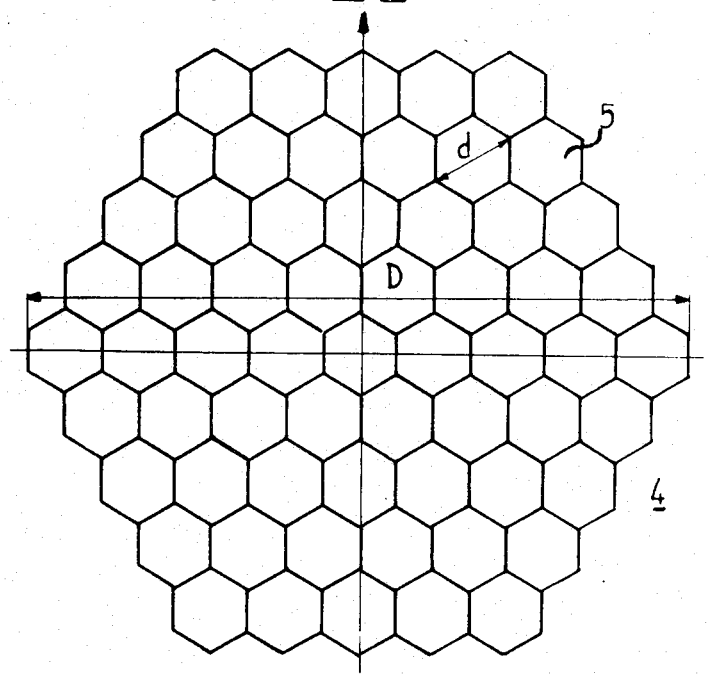
FIG_2
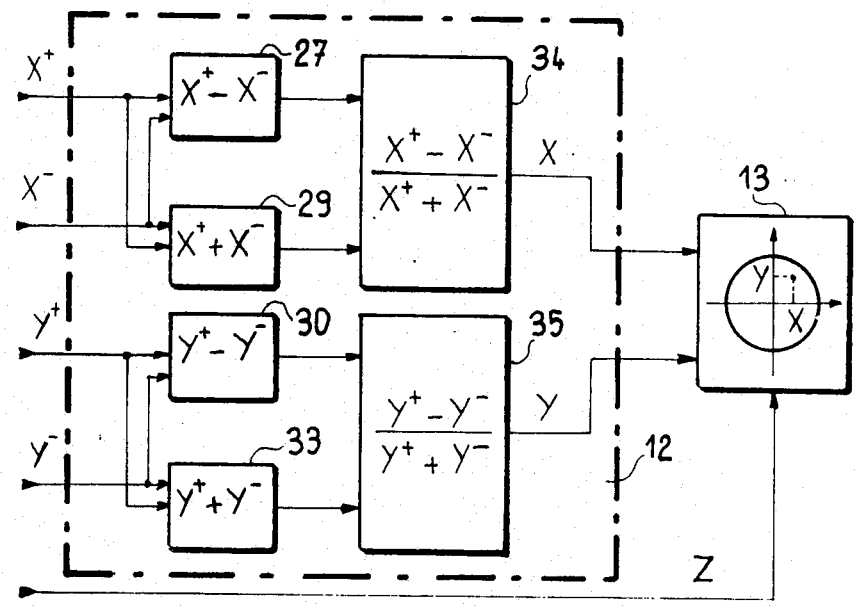
FIG_3

METHOD FOR PROCESSING LOCATING PULSES SUPPLIED BY A GAMMA CAMERA AND A GAMMA CAMERA UTILIZING THIS METHOD

BACKGROUND OF THE INVENTION

The invention relates to a method for processing locating pulses supplied by a gamma camera and to a gamma camera applying this method. It relates to scintillation or gamma cameras of the ANGER type, its principles of operation and embodiments being disclosed in U.S. Pat. No. 3,011,057. These gamma cameras are intended to detect and provide a visual display of photons emitted by radioactive bodies.

Gamma cameras are utilised in nuclear medicine in order to establish a visual display of the distribution within an organ of molecules tagged by a radioactive isotope which had been injected into a patient. A gamma camera commonly comprises a collimator for focussing the gamma photons emitted by the patient, a scintillator crystal for converting the gamma photons into luminous photons or scintillations, and an array of photomultiplier tubes which in each case convert the scintillations into electrical pulses referred to as electrical tube contributions. It also comprises electronic circuits for deriving from the electrical contributions provided by the photomultiplier tubes signals giving the X and Y coordinates of the location at which the scintillation had occurred, as well as a signal Z for validation when the scintillation energy W lies within a predetermined energy range.

This detection chain is followed by a visual display system commonly comprising a cathode-ray oscilloscope controlled by the signals giving the X and Y coordinates and the signal Z in order to produce a visual display in the form of a bright dot on the screen of the point of impact of the gamma photon on the crystal. The visual display system may possibly incorporate a photographic device to establish an image of the organ examined by integrating a very large number of bright dots generated on the cathode-ray tube screen. It may also comprise a device for digital processing of the images.

Amongst other qualities, a gamma camera should have a satisfactory spatial resolution, that is to say the capacity of distinguishing closely spaced small radioactive sources, a satisfactory response in respect of counting rate, that is to say the capacity to process a large number of events per unit of time, and an image quality unaffected by the energy of the isotope in question.

The spatial resolution depends on the accuracy of calculation of the X and Y coordinates. The quality of the calculation of these coordinates depends substantially on the physical principles governing the operation of the different parts of the gamma camera. Thus, the interaction between a gamma photon and the crystal causes a luminous scintillation of which the intensity decreases exponentially with time. The time constant of this reduction is characteristic of the scintillator crystal utilised. For a thallium-activated sodium iodide crystal NaI(Tl), it is of the order of 250 nanoseconds. This scintillation is detected simultaneously by several photomultiplier tubes. The luminous photons forming this scintillation release photoelectrons from the photocathodes of the photomultiplier tubes. The number of photoelectrons released follows POISSON's statistical law for a given scintillation. This means that the electrical contribution of a photomultiplier tube receiving a scintillation has an amplitude of a value which follows a Poisson statistical distribution and of which the mean value is a function of the energy of the incident luminous photons. Moreover, at constant energy this electrical contribution is a substantially Gaussian function of the distance separating the centre of this photomultiplier tube from the location at which the scintillation had occurred. If the scintillation occurs in line with the centre of this tube, the electrical contribution is a maximum; the electrical contribution decreases with increasing distance of the scintillation location from the centre of the tube. By way of example, if a scintillation occurs in line with a wall of the tube, its electrical contribution is reduced by approximately half as compared to the maximum electrical contribution.

A scintillation is detected at the same time by several photomultiplier tubes, commonly by 6 to 10 tubes. The determination of the location of this scintillation on the crystal, which itself illustrates the point of emission of the energising gamma photon, may be obtained by calculating the position of the barycentre of the electrical contributions provided by the assembly of the photomultiplier tubes energised by this scintillation. According to ANGER, this calculation is performed in a simple manner by injecting the electrical contributions through a set of matrices of resistors whose resistivity values are a function of the positions of the photomultiplier tubes to which they are connected. The positions of these tubes are located with respect to Cartesian reference axes of which the point of intersection is commonly situated at the centre of the network of tubes. The set of matrices commonly comprises five matrices: four matrices serving the purpose of location, and one matrix being utilised to measure the energy. There are as many resistors in each matrix as there are photomultiplier tubes in the network of tubes. Each of the resistors is connected on the one hand to the output of a different photomultiplier tube, and on the other hand to a common point forming the output of the matrix. In this manner, these resistors establish a balance of the electrical contributions of each of the photomultiplier tubes supplying these.

A problem which is difficult to resolve in respect of a given scintillation, is that of determination with optimum precision of the mean values of the amplitudes of each of the electrical contributions. It is known that these contributions may be integrated in time over a period of the order of the decay time constant of the scintillations of the scintillator crystal. The period of this integration typically amounts to the order of three times the time constant. The period of integration required is a direct consequence of the Poisson statistic. As a matter of fact, the typical difference or deviation of the fluctuation of the amplitude of the electrical contributions according to the Poisson statistic is inversely proportional to the square root of the number of photoelectrons released. Thus, the longer the integration, the greater will be the number of photoelectrons taken into account and the smaller the typical deviation and the more precisely will the mean value of this contribution be assessed with precision. As a matter of fact, the operation for calculating the location of the barycentre being a linear operation, it is more economical to perform this integration at the output of each of the matrices of resistors of the set of matrices. In effect, these matrices merely establish a weighting or balance of the contributions of each tube as a function of the location of the tube on the crystal. The electrical pulses supplied at the output of the matrices of the set of matrices of resistors are referred to as weighted or balanced pulses. It will be noted in passing that the period of integration is thus linked directly to the quality of spatial resolution of the gamma camera, but that this quality is obtained at the expense of the counting rate, that is to say, at the expense of the number of events per second taken into account.

This integrating operation does not operate without some difficulties. The main one of these consists in the presence of constant direct voltages which are superimposed over the balanced pulses supplied by the matrices and which upon being fed into integration falsify the value of the signal supplied by these to an extent in direct proportion with the period of integration. The origin of these direct voltages consists principally in the presence of variable gain amplifiers interposed between each resistor matrix and a corresponding integrator. These variable gain amplifiers are utilised to perform an amplitude matching of the balanced pulses to the operational dynamics of the utilised integrators, and as a result for selection of an energy range to be investigated. These direct voltages which should be eliminated may have other origins, in particular that resulting from an action referred to as clutter of scintillations. In a patent application filed on the same day, the applicants disclosed a device making it possible to eliminate these direct voltages from the useful signal.

The balanced or weighted pulses denoted by $x^+$, $x^-$, $y^+$ and $y^-$ are converted by the integrating operation after being received from the locating matrices, into so-called locating pulses generally denoted by $X^+$, $X^-$, $Y^+$ and $Y^-$. These locating pulses are fed into a calculator circuit which supplies the X and Y coordinate signals. The signals X and Y are proportional, respectively, to $(X^+ - X^-)$ and to $(Y^+ - Y^-)$ Now, the amplitudes of the locating pulses derive from the energy W of the scintillation which had caused these to be generated. It is known in the prior art to get rid of this energy by performing a standardisation of X and Y in the calculator circuit, in the form:

$$X = \frac{X^+ - X^-}{W} \text{ and } Y = \frac{Y^+ - Y^-}{W}$$

whilst yielding significant results, this method has particular shortcomings.

In effect, the energy W is obtained by integration as for the locating pulses $X^+$, $X^-$, $Y^+$ and $Y^-$, from a balanced pulse w supplied by a so-called power matrix of the set of matrices. All the balancing resistors are practically identical in the power matrix. They are adjustable at the manufacturers plant from one photomultiplier tube to another so that the power response is the same under each tube notwithstanding the position of this tube on the crystal. It follows that the energy W will be the same for scintillations of identical energy in each case, but occurring at random points on the scintillator. This statement should be qualified however by the fact that for each scintillation it is the mean value of the different W's and the variance of W which are the same since the photomultipliers are performing detecting operations in accordance with Poisson's statistic. On the contrary, in the case of the matrices serving the purpose of location, that is to say supplying balanced pulses $x^+, x^-, y^+$ and $y^-$, the resistances vary as a function of the position of the photomultiplier tubes on the crystal.

For example, if $x_i$ denotes the abscissa of a tube with respect to the Cartesian reference axes, the resistance of the matrix supplying $x^+$ have values equal to:

$$\frac{R_o}{\frac{2x_i}{D} + 1}$$

in which $R_o$ is a characteristic resistance selected as a function of the output impedance of the matrices, and in which D is the length of the median of the grid of tubes. The resistances of the matrix supplying $x^-$ have values equal to:

$$\frac{R_o}{1 - \frac{2x_i}{D}}$$

and similar values are allocated to the resistors of the matrices supplying $y^+$ and $y^-$ as a function of the ordinate $y_i$ of the photomultiplier tube in question. These balancing resistors thus comply with hyperbolic functions. As a result, the variance of the locating pulses (or their degrees of freedom) $X^+, X^-, Y^+$ and $Y^-$ depends on the point at which the scintillation had occurred, since the resistors of the locating matrices then perform precisely different balancing actions as a function of this point on the corresponding electrical contributions. Since the variance of W is constant, the standardisation of X or Y by W is consequently falsified.

Furthermore, it is known that the locating matrices may include non-linear elements in series with each of the resistors between the output of these resistors and the output of the matrix. The purpose of these non-linear elements is to eliminate excessively weak electrical contributions, that is to say having a level of the same order as that of the scintillation and detection noises. Non-linear elements of this kind are absent from the power matrix. As a result, by standardising X and Y as apparent from the foregoing, a linear function W of the scintillation energy standardises signals $(X^+ - X^-)$ or $(Y^+ - Y^-)$ which are not strictly proportional to this scintillation energy. Consequently, this is another cause of errors in calculating X and Y.

Another mode of standardisation consists in allowing for the sum of the locating pulses. In this case, the following expressions are applied:

$$X = \frac{X^+ - Y^-}{X^+ + X^- + Y^+ + Y^-} \text{ and } Y = \frac{Y^+ - Y^-}{X^+ + X^- + Y^+ + Y^-}$$

This solution is not satisfactory, as demonstrated by experimental results. As a matter of fact, for scintillations which all occur at one and the same ordinate ($y^i$) the sum of the locating pulses $(X^+ + X^-)$ is not constant and the values of Y resulting from the second formula are consequently different, whereas they are precisely those which should be equal since they apply to scintillations having the same ordinate.

SUMMARY OF THE INVENTION

The present invention has as its object to resolve the drawbacks referred to, by standardising the X,Y coordinate signals by means of a signal which is merely the result of a combination of the locating pulses which had served the purpose respectively of generating X or Y.

The invention provides a method of processing locating pulses supplied by a gamma camera, in which:

scintillations generated by the action of a gamma radiation in a scintillator crystal are detected, amplified and converted into electrical contributions by a network of photomultiplier tubes;

the said contributions are balanced in matrices of resistors in order to generate balanced pulses with respect to a system of reference axes;

the said balanced pulses are then summated and integrated in an integrator stage to generate the said locating pulses;

the said locating pulses are converted and standardised by means of a calculator circuit, into electrical signals representing the Cartesian coordinates of the locations of the scintillations on the crystal;

characterised in that a standardisation of the coordinate signals is performed in the calculator circuit by dividing the difference between two locating pulses with respect to a coordinate axis by the sum of the same locating pulses along this axis, the same operation being performed for each reference axis.

The invention equally has as its object a gamma camera equipped with a device for processing locating pulses, comprising a collimator for focussing a gamma radiation which is to be measured on a scintillator crystal, a network of photomultiplier tubes for detection of the scintillation emitted by the scintillator and for amplifying the electrical contributions resulting from these detections, a set of matrices of resistors for balancing and summating the electrical contributions and thus for generating balanced pulses with respect to a system of reference axes, an integrator stage for summating and integrating the balanced pulses and generating locating pulses, and a calculator circuit for conversion and standardisation of the locating pulses into electrical signals representing Cartesian coordinates of the locations of the scintillations on the crystal, characterised in that the calculator circuit comprises means for performing a standardisation of the coordinate signals by dividing the difference between two locating pulses along a reference axis by the sum of the same pulses along this axis.

BRIEF DESCRIPTION OF THE DRAWINGS

A clearer grasp of the invention will be gained by reading the following description in conjunction with the figures accompanying the same. This description is given purely by way of example and not by way of limitation of the features of the invention. Identical symbols denote identical elements in these figures. In these drawings:

FIG. 1 illustrates a block diagram of a gamma camera equipped with the standardising means in accordance with the invention, FIG. 2 illustrates a view in cross-section of an array of photomultiplier tubes, FIG. 3 illustrates a block diagram of the calculator circuit of the invention.

DETAILED DESCRIPTION OF THE INVENTION

From FIG. 1 is apparent the general layout of a gamma camera in which the gamma rays g emitted by a radioactive substance 1 are focussed by means of a collimator 2 on a scintillator 3. The gamma radiation g emitted generates a scintillation s of which the luminous photons p act on the photocathodes of an array 4 of photomultiplier tubes 5. Electrical contributions c detected by the tubes 5 are supplied to the inlet of a set 6 of matrices of resistors. The set 6 of matrices of resistors comprises five matrices in this case, which simultaneously and respectively provide weighted or balanced pulses $x^+, x^-, y^+, y^-$, and w. These balanced pulses are reshaped by a stage 7 of variable gain amplifiers such as 8. These balanced pulses are then coupled capacitatively in each case by a circuit 9 for restoration of base potential to the corresponding integrator 10 of the integrator stage 11. The locating pulses $X^+, X^-, Y^+, Y^-$ supplied by the stage 11 are then fed into a calculator circuit 12. At its output, the circuit 12 provides the X,Y coordinates intended to serve the purpose of providing a visual display of a luminous dot P on the screen of an oscilloscope 13. The position of the dot P with respect to the abscissa and ordinate axes appearing on this screen represents the locus of the scintillation s on the scintillator 3 and consequently the location of emission of the gamma radiation g in the radioactive substance 1.

In an example, the collimator 2 is a lead plate of a thickness of several centimetres, pierced by a plurality of holes 14 directed at right angles to its surface so that only the photons propagated at right angles to this surface are allowed to pass the incident gamma radiation. It is known that, depending on its nature, the radioactive substance emits gamma photons differing in energy, for example gamma rays having energies of 80 Kev, 122 Kev or 360 Kev. In one example, the crystal 3 is based on thallium activated sodium iodide as stated in the foregoing. The luminous photons p energise the photocathodes of the photomultiplier tubes 15,16,17,18 which are situated in alignment with the place at which the scintillation s had occurred.

In a manner preferred in the invention, the photomultiplier tubes such as 5 each have a hexagonal cross-section and are adjacent to each other to form a honeycomb network, shown in cross-section in FIG. 2. In one example, the surface area taken up by this network has a size of the order of 60×60 cms, the median d of each of the tubes being of the order to 6 cms. The number of tubes of the network is 61 in this case. The Cartesian reference axes are apparent from this figure. Each of the photomultiplier tubes such as 5 contains a set of dynodes such as 19 (FIG. 1) for amplification of the detections obtained by means of these tubes. All the photomultiplier tubes of the grid are adjusted in such a manner that they inject an identical contribution c into the set 6 of matrices when they receive the same luminous energy on their photocathode.

The set 6 of matrices comprises five matrices, each comprising an identical number of resistors, being 61 resistors in this case, since there are 61 tubes. Each resistor of a matrix is connected on the one hand to the output of a photomultiplier tube and on the other hand to a common terminal forming the output of the matrix. The resistors of the matrices serve the purpose of generating locating pulses having non-linear elements indicated by the presence of a diode in series with the resistor at their downstream side. In the fifth matrix providing the balance pulse w representing the energy W of the scintillation, all the resistors have a practically identical resistance and there are no non-linear elements. After integration in the integrators 10 of the integrator stage 11, the balanced pulses are converted into locating pulses $X^+, X^-, Y^+, Y^-$ and into power pulses W, respectively.

The base potential restoration means 9 interposed between the set 6 of matrices and the integrator stage 11

(no further mention will be made in the following of the set 7 of variable gain amplifiers 8) operate in the following manner. When a balanced pulse corresponding to a scintillation appears, in particular on the channel of energy w, it is taken into account by a circuit 20 for detection of the appearance of the pulse. As from the onset of this balanced pulse, the circuit 20 transmits an order F fed to a relay 21 of the circuit 9. The relay 21 is of the rapid analog gate type (for example DG 181 BA of SILICONICS). Throughout the period of presence of the order F, which is referred to as the restoration period, the closed relay 21 restores a base potential at the terminal 22 of the capacitance 23 which is connected to the integrator 10. The base potential is indicated by an earthing connection in this case. Since the balanced pulse $x^+$ is fed into the device 9 via a delay line 24, the transmission of the pulse $x^+$ is not influenced by this enforced potential. Once the order F stops, the relay 21 opens and, because of the time constant imposed by the input impedance of the integrator 10 in combination with the capacitance 23, the potential of the terminal 22 remains at the imposed value. The pulse which had been delayed in the delay line 24 then reaches the capacitance 23 which it then evidently traverses for application to the input of the integrator 10. The delay period of the delay line 24 is clearly greater than or equal to the period of the restoration order F. The means 9 and 20 form the object of a patent application filed by the applicants on the same day and permit elimination of direct interference voltages from the usable signal.

The circuit 20 which within a set of comparators 25 and 36 compares the balanced pulses w respectively to a low threshold SB and to a high threshold SH which are predetermined, supplies the order F when w lies within the energy range defined by these thresholds. The order F is supplied by an AND gate 37 which at its input receives the outputs of the comparators 25 and 36. The order F may then be fed into a logic circuit 26 which essentially comprises a retarding means for actuation of the integrators 10 synchronously with the arrival of the balanced pulses. Derived from the order L thus applied to the integrators, a validation instruction Z is supplied to the visual display means 13 via a retarder circuit 38 to assure synchronisation of this visual display.

In FIG. 3, the locating pulses $X^+, X^-, Y^+, Y^-$ are fed in pairs to the input of a set of four summators contained in the calculator circuit 12. The summator 27 receives the signal $X^+$ supplied by the integrator 10, at a first input. At a second input, it receives the signal $X^-$ supplied by the integrator 28. This second input is a reversed input and the summator 27 supplies the signal $(X^+ - X^-)$. The summator 29 receives the same signals as the summator 27 but does not comprise a reversed input, and consequently supplies the signal $(X^+ + X^-)$. The summator 30 receives the signal $Y^+$ supplied by the integrator 31 at a first input, and the signal $Y^-$ supplied by the integrator 32 at a second input. The second input of the summator 30 is a reversed input and this summator supplies the signal $(Y^+ - Y^-)$. The summator 33 receives the same signals as the summator 30 but does not comprise a reversed input and consequently supplies the signal $(Y^+ + Y^-)$. These integrators (10,28,31 and 32) and these summators (27,29,30,33) are of a known type.

The outputs of the summators 27 and 29 are connected to the two inputs of a divider 34. This divider 34 performs the division:

$$\frac{X^+ - X^-}{X^+ + X^-}$$

The outputs of the summators 30 and 33 are connected to the two inputs of a divider 35. This divider 35 performs the division:

$$\frac{Y^+ - Y^-}{Y^+ + Y^-}$$

These dividers are rapid analog dividers of the Analog Devices 429B or Teledyne Philbrick 4457 types. These are able to perform an analog division to within 0.1% in less than 2 microseconds. They introduce an idle period or dead time into the gamma camera which is sufficiently brief to be adaptable to the required counting rate specifications. The outputs of the dividers 34 and 35 which form the outputs of the circuit 12 respectively supply the X and Y coordinate signals.

It is apparent that the standardisation of X or Y is secured in this manner merely by utilising the locating pulses $X^+$ and $X^-$ or $Y^+$ and $Y^-$, respectively, serving the very purpose of generating X or Y. Consequently, the changes in variance of the non-linearity actions affecting the calculation of each of these coordinate signals, play no part. On an experimental basis, an improvement in spatial resolution exceeding 10% is obtained by means of the method of processing the locating pulses in accordance with the invention.

Furthermore, it is known that the dot P on the oscilloscope screen may be located by location of the photomultiplier tubes along three coordinate axes. These three non-Cartesian axes are centred on the middle of the network of tubes and are oriented to subtend angles of 120° with each other. In this case, the set of matrices comprises six locating matrices and six locating pulses, for example bearing the notations $A^+, A^-, B^+, B^-, C^+, C^-$ are supplied by six integrators connected to these six matrices. The calculation of the coordinates A,B,C, of the point representing the scintilation is identical to that described by ANGER, which is to say that A is proportional to $(A^+ - A^-)$, B to $(B^+ - B^-)$ and C to $(C^+ - C^-)$. In accordance with the present invention, the standardisation of A,B,C may be obtained by dividing these values by, respectively, $(A^+ + A^-)$, $(B^+ + B^-)$ and $(C^+ + C^-)$. A subsequent trigonometrical conversion permits rediscovering X and Y from A,B and C.

We claim:
1. A method for processing locating pulses supplied by a gamma camera, comprising;
   detecting scintillations generated by the action of a gamma radiation in a scintillator crystal,
   amplifying and converting said detected scintillations into electrical contributions by a network of photomultiplier tubes,
   weighting and balancing said contributions by a set of matrices of resistors to establish balanced pulses with respect to a system of reference axes,
   the summing and integrating said balanced pulses in an integrator stage to generate the locating pulses,
   converting and standardizing said locating pulses by a calculator circuit into electrical signals represent- ing the Cartesian coordinates of the location of the scintillations on the crystal, performing a standardization in the calculator circuit on the coordinate signals by dividing the substraction of two locating pulses along one coordinate axis by the sum of the same pulses along this axis, the same operation being performed for each reference axis.

2. A gamma camera equipped with a device for processing the locating pulses, comprising a collimator for focussing a gamma radiation which is to be measured on a scintillator crystal, a network of photomultiplier tubes for detection of the scintillations emitted by the scintillator and for amplification of the electrical contributions resulting from these detections, a set of matrices of resistors for balancing the electrical contributions and thereby for generating balanced pulses with respect to a system of reference axes, an intergrator stage for summing and integrating the balanced pulses and generating the said locating pulses, and a calculator cirucit for converting the locating pulses into electrical signals representing the Cartesian coordinates of the locations of the scintillations on the crystal, characterized in that the calculator circuit comprises standardization means for performing a standardization of the coordinate signals by dividing the subtraction of two locating pulses along one reference axis by the sum of the same locating pulses along this axis.

3. A gamma camera according to claim 2, characterized in that the standardization means comprises summing means summing the located pulses cooresponding to one and the same coordinate axis.

* * * * *